United States Patent [19]
Luft et al.

[11] Patent Number: 5,973,087
[45] Date of Patent: Oct. 26, 1999

[54] PROCESS FOR THE PRODUCTION OF ETHYLENE CO-POLYMERS

[75] Inventors: Gerhard Luft, Mühltal, Germany; Majid Jabbari, Hamadan, Islamic Rep. of Iran; Maximilian Dorn, Grünwald, Germany

[73] Assignee: Peroxid-Chemie GmbH, Pullach, Germany

[21] Appl. No.: 08/793,719

[22] PCT Filed: Sep. 4, 1995

[86] PCT No.: PCT/EP95/03470

§ 371 Date: Mar. 3, 1997

§ 102(e) Date: Mar. 3, 1997

[87] PCT Pub. No.: WO96/07679

PCT Pub. Date: Mar. 14, 1996

[30] Foreign Application Priority Data

Sep. 5, 1994 [DE] Germany ............... 44 31 613

[51] Int. Cl.$^6$ ............... C08F 210/02; C08F 4/34; C08F 4/52
[52] U.S. Cl. ............... 526/184; 526/329; 526/331; 502/152; 502/160
[58] Field of Search ............... 526/184, 331, 526/913, 329; 502/152, 160

[56] References Cited

U.S. PATENT DOCUMENTS

| | | | |
|---|---|---|---|
| 2,396,785 | 3/1946 | Hanford | 526/331 |
| 3,029,230 | 4/1962 | Strauss | 526/331 |
| 3,156,675 | 11/1964 | Ehmann et al. | 526/184 |
| 3,198,780 | 8/1965 | Mortimer et al. | 526/184 |
| 3,579,491 | 5/1971 | Carrega | 526/184 |
| 4,048,425 | 9/1977 | Kuntz | 526/184 X |
| 4,794,004 | 12/1988 | Pfleger et al. | 526/331 |

FOREIGN PATENT DOCUMENTS

| | | |
|---|---|---|
| 0175318 | 3/1986 | European Pat. Off. . |
| 0475124 | 3/1992 | European Pat. Off. . |
| 1298155 | 5/1962 | France . |
| 3207263 | 9/1983 | Germany . |
| 3322329 | 12/1983 | Germany . |

OTHER PUBLICATIONS

File 350:Derwent World Pat.; Oct. 4, 1979; Week 7944; JP79031039 Mitsui Petrochem Ind KK; Abstract: An aliphatic alpha–olefin (I) is co–polymerised using a catalyst system consisting of . . . .

Macromolecules, vol. 10, No. 2, Mar.–Apr. 1977; Ethylene–VAc Copolymerization by $AlR_3$–Lewis Base–Peroxide; pp. 249–253; T. Yatsu, S. Moriuchi, and H. Fujii; Copolymerization of Ethylene with Vinyl Acetate by Trialkylaluminum–Lewis Base–Peroxide Catalyst, Mitsui Petrochem Industries 1976.

000584258 WPI; NL 268250; Week 6801; Assignee–Farbwerke Hoechst AG; Abstract–Polymerisation process for the mfte. of a copolymer of an . . . .

Section Ch, Week 7944, Derwent Publications Ltd., London, GB; Class A17, AN 79–80223B & JP, B, 54 031 093 (Mitsui Petrochem Ind KK), Oct. 4, 1979.

Section Ch, Week 7542, Derwent Publications Ltd., London, GB; Class A18, AN 75–69460W & JP,A,49 124 190 (Mitsui Petrochem KK), Nov. 27, 1974.

Macromolecules, vol. 10, No. 2, Mar. 1977–Apr. 1977, pp. 249–253, Yatsu et al, 'Copolymerization of Ethylene with Vinyl Acetate by Trialkylaluminum–Lewis Base–Peroxide Catalyst'.

*Primary Examiner*—Fred Teskin
*Attorney, Agent, or Firm*—Fulbright & Jaworski, LLP

[57] ABSTRACT

Disclosed is a catalyst system for the production of ethylene co-polymers by co-polymerisation of ethylene with further polymerisable monomers in the presence of a peroxide catalyst. The catalyst system contains components (A) and (B), component (A) being at least one organo-aluminium compound of the general formula $AlR_3$, in which R is an alkyl, alkenyl, aryl, aralkyl or cycloalkyl radical, and component (B) is at least one organic peroxide.

2 Claims, No Drawings

PROCESS FOR THE PRODUCTION OF ETHYLENE CO-POLYMERS

BACKGROUND OF THE INVENTION

The present invention is concerned with a process for the production of ethylene co-polymers under elevated pressure with the use of a peroxide catalyst, as well as with a catalyst for carrying out this process.

Processes for the polymerisation of ethylenically-unsaturated monomers under elevated pressure and elevated temperature in the presence of a peroxide catalyst are known.

DE-A-3322329 describes a process for the production of polyethylene by the polymerisation of ethylene and a co-polymerisable monomer in the presence of a catalyst of a transition metal derivative and an organo-aluminium derivative in which an organic peroxide is added to the polymerisation product at the outlet from the reaction zone in order thereby to deactivate the residual catalyst.

JP-B-79031039 describes the (co)polymerisation of aliphatic α-olefins with the use of a catalyst system which consists of a trialkylaluminium, an electron donor and a peroxide.

D. Yatsu et al., American Chemical Society, Division of Polymer Chemistry, Polymer Reprints, Vol. 16, No. 1, April 1975, pages 373 to 378 described the co-polymerisation of ethylene and vinyl acetate in the presence of a three-component catalyst system of triethyl aluminium, a Lewis base and a peroxide.

NL-A-268 250 describes a low pressure co-polymerisation of olefins containing 2 to 4 carbon atoms with a vinyl ester. The process is carried out at a pressure of <70 ats and at a temperature of −80 to +60° C. As catalyst, there is used a mixture of peroxide and an organo-aluminium compound.

It is an object of the present invention to provide an economic process for the co-polymerisation of ethylene with further polymerisable monomers in the presence of a peroxide catalyst at high pressures and a high temperature with which an improvement of the polymer yield per unit weight of peroxide used can be achieved.

THE INVENTION

According to the present invention, there is provided a process for the production of ethylene co-polymers under elevated pressure in the presence of a peroxide catalyst, wherein, as catalyst, there is used a catalyst system containing components (A) and (B), component (A) being at least one organo-aluminium compound of the general formula $AlR_3$, in which R can be the same or different and is an alkyl, alkenyl, aryl, aralkyl or cycloalkyl radical and component (B) is at least one organic peroxide, the polymerisation being carried out at a pressure of $>300$ bar and at a temperature of $>80°$ C.

In a preferred embodiment of the invention, vinylacetate and/or methyl acrylate is used as co-monomer.

The present invention is also concerned with the use of a catalyst system in a high pressure polymerisation process for the production of polyolefins by polymerisation of α-olefins, for example for use in the process according to the present invention, wherein the catalyst system contains the components (A) and (B), the component (A) being at least one organo-aluminium compound of the general formula $AlR_3$, in which R can be the same or different and is an alkyl, alkenyl, aryl, aralkyl or cycloalkyl radical and component (B) being at least one organic peroxide.

The polymerisation is preferably carried out at a pressure of $>500$ bar and especially at a pressure of from 1500 to 2500 bar. The polymerisation temperature is preferably from 80 to 300° C. and especially from 100 to 250° C.

In the catalyst system consisting of components (A) and (B) the amount of component (A) is preferably ca. 0.001 to 100 mol, calculated as monomeric organo-aluminium compound per mol of monomers used. The amount of catalyst component (B) is preferably ca. 0.01 to 100 mol per mol of catalyst component (A).

The amount ratio of catalyst mixture to monomer is preferably 10 to 250 mol of catalyst (A and B) per $10^6$ mol of monomer mixture and especially preferably 50 to 150 mol of catalyst per $10^6$ mol of monomer mixture.

As co-monomers, in the process according to the present invention, there can be used all monomer co-polymerisable with ethylene. The following list shows some examples for such polymerisable monomers.

A) acrylic and methacrylic compounds for example
   acrylic and methacrylic acid,
   acrylic and methacrylic acid esters (methyl acrylate, ethyl acrylate, propyl acrylate, isopropyl acrylate, n-butyl acrylate, tert.-butyl acrylate, 2-ethylhexyl acrylate, stearyl acrylate and the corresponding methacrylic acid hydroxyalkyl esters, acrylic acid and methacrylic acid esters),
   2-hydroxyethyl acrylate,
   2-hydroxypropyl acrylate,
   4-hydroxybutyl acrylate and the corresponding methacrylic acid esters,
   acrylic and/or methacrylic allyl ester methylene-bis-acrylamide,
   acrylic and methacrylic acid vinyl ester,
   acrylonitrile and methacrylonitrile,
   acrylamide and methacrylamide, B) polymerisable vinyl and vinylidene compounds for example styrene
   nuclear-chlorinated,-alkylated and -alkenylated styrenes (vinyl-toluene, divinylbenzene, α-methylstyrene, tert.-butylstyrene, chlorostyrenes), vinyl esters of carboxylic acids with 2 to 6 carbon atoms (vinyl acetate),
   vinyl ethers (vinyl propyl ether, vinyl isobutyl ether)
   maleic anhydride,
   maleic acid hemiesters with 1 to 4 carbon atoms in the alcohol component,
   maleic acid diesters,
   maleic acid semiimides,
   maleic acid diimides and cyclic imides (N-methyl-maleinimide, N-cyclohexylmaleinimide)
   allyl compounds,
   allylbenzene,
   allyl esters (allyl acetate, phthalic acid diallyl ester, isophthalic acid diallyl ester, maleic and fumaric acid diallyl ester, allyl carbonate, diallyl carbonates, diallylphenyl carbonates, triallyl phosphate, triallyl cyanurate and isocyanurate),
   ethylene glycol diallyl ether,
   vinylpyrrolidone,
   vinyl chloride,
   vinylidene chloride, C) conjugated dienes for example butadiene
   isoprene, and
   chloroprene.

In the process according to the present invention, vinyl acetate and/or methyl acrylate is preferably used as co-monomer.

The co-polymerisation can take place in a manner known for the co-polymerisation of ethylene with further polymerisable monomers in the presence of a catalyst, especially in the presence of a peroxide catalyst, and the polymer is isolated in known manner. In general, the polymerisation takes place in the mass but it can also be carried out in a solvent, i.e. as solution polymerisation.

Surprisingly, we have found that, with the use of the catalyst system according to the present invention, the peroxide consumption in the co-polymerisation of ethylene with further polymerisable monomers initiated by organic peroxides can be lowered, i.e. the polymer yield per unit weight of peroxide can be considerably improved.

The catalyst system consisting of the catalyst components (A) and (B) is added to the monomers in substance or solution, the dosing in of the individual catalyst components (A) and (B) taking place mixed or separately. The catalyst components can thereby either be fed in all at once into the reaction zone or continuously in small concentration; especially depending upon the nature of the polymerisation as mass or solution polymerisation, the components can be added as such or in solution. In the case of addition in solution, as solvent there is preferably used the same solvent as for the solution polymerisation.

The reaction can be carried out continuously or discontinuously. As reactor types, there can be used the reactor types known for such polymerisations, for example flow pipe, stirrer vessel, stirrer vessel cascade and similar reactor types.

Furthermore, in the process according to the present invention, further desired additives can be added to the reaction mixture, especially molecular weight regulators.

As solvents for the solution polymerisation, there can also be used those known for such polymerisations. Preferably, there are used aliphatic or alicyclic saturated hydrocarbons, for example hexane, heptane, octane, cyclohexane, isododecane, or mixtures of such saturated hydrocarbons, for example petroleum ether, kerosine or Decalin. These solvents are preferably also used as solvents for the catalyst components of the catalyst system used according to the present invention.

In catalyst component (A), the radical R is an alkyl, or alkenyl radical with preferably 1 to 30, especially preferably 1 to 14 and most preferably 1 to 7 carbon atoms or an aryl, aralkyl or cycloalkyl radical with preferably 5 to 20 carbon atoms. Typical examples for radical R are alkyl radicals, for example methyl, ethyl, butyl, hexyl, heptyl, octyl and dodecyl but also higher, especially linear alkyl radicals; alkenyl radicals, for example allyl; optionally substituted aryl radicals, for example phenyl or tolyl radicals; aralkyl radicals, for sample benzyl radicals; and cycloalkyl radicals, for example cyclohexyl radicals.

As typical examples of the organo-aluminium compounds $AlR_3$, there can be mentioned trimethyl, triethyl, tributyl, trihexyl, trioctyl, tridodecyl, triphenyl, tritolyl or tribenzyl aluminium and mixed organo-aluminium compounds, for example a mixture of triethyl and tributyl aluminium or of triethyl and tribenzyl aluminium.

The compounds of the components (A) and the peroxides of the component (B) can be used alone or in mixture of two or more components of the same group and/or also as mixture of one or more components of the same group with one or more components of the other group.

As organic peroxide of the catalyst component (B), there is preferably used one which is known for the initiation of such polymerisation reactions of α-olefins. Diacyl peroxides with 4 to 18 carbon atoms and per esters with 5 to 15 carbon atoms are preferably used. As typical examples for diacyl peroxides, there can be mentioned isobutyryl peroxide, lauroyl peroxide and benzoyl peroxide; as example for per esters, there can be mentioned tert.-butyl perpivalate, tert.-butyl perneodecanoate and tert.-butyl per-2-ethylhexanoate. Peroxymonocarbonates, for example tert.-butylperoxyethylhexyl carbonate, have also proved to be very useful for the process according to the present invention.

Ethylene co-polymers produced by the process according to the present invention can be used for all purposes of use of such co-polymers.

The following Examples are given for the purpose of illustrating the present invention, without limiting it thereto. In the Examples, the following abbreviations are used:

TBPPI: tert.-butyl perpivalate
TBPEH: tert.-butyl per-2-ethylhexanoate
TEA: triethyl aluminium
TDDA: tridodecyl aluminium
E: ethylene
VA: vinyl acetate
MA: methyl acrylate
U: conversion

EXAMPLE 1

The reaction was carried out in a continuously operated stirrer kettle autoclave, the stirrer of which consisted of 2 propellers, the wings of which were staggered towards one another. Heating took place by induction. The reaction temperature was monitored via a thermoelement. The pressure regulation took place by means of PID control. A solution of triethyl aluminium in absolute heptane (4% by weight) was used and, as peroxide compound, tert.-butyl perpivalate in absolute heptane (2% by weight). The solutions of the components were dosed into the reaction vessel via spindle reciprocating pumps. Previously, all plant parts were completely filled with argon. The ethylene was dosed in, without solvent, via a gas compressor and the vinyl acetate was dosed in undiluted by means of a diaphragm pump.

The reaction was started by the simultaneous dosing in of the monomers and of the solutions of the catalyst components. The mass currents of the individual educts amounted to 0.2038 g/s for the ethylene, 0.0304 g/s for the vinyl acetate, $6.635 \times 10^{-5}$ g/s for the tert.-butyl perpivalate and $2.175 \times 10^{-5}$ g/s for the triethyl aluminium.

Working was carried out at a reaction temperature of 136° C., a reaction pressure of 1900 bar and an average residence time of 40 seconds, the reaction being carried out for 20 minutes. The product of the last 10 minutes was collected and dried in a vacuum. Referred to the monomers used, the conversion was 19%.

EXAMPLES 2 to 9

Working was carried out as in Example 1, the catalyst components (A) and (B) and the polymerisation conditions used being given in the following Table 1. The results obtained are also given in Table 1.

Unless otherwise indicated, working was under the following reaction conditions: The peroxides were used in a solution in absolute heptane (2% by weight) and continuously added to the polymerisation vessel at a concentration of 50 mol ppm. The organo-aluminium compounds were used in solution in absolute heptane (4% by weight). The statements in mol refer to the monomer used. The average residence time was 40 seconds.

EXAMPLE 10

In comparison Example 10, working was as described or Examples 2 to 9 but without catalyst component (A).

TABLE 1

| example | monomer (wt. %) | co-monomer (wt. %) | cat. component A (mol ppm) | cat. component B (mol ppm) | reaction conditions T(° C.) | p(bar) | polymer produced conversion (%) |
|---|---|---|---|---|---|---|---|
| 1 | E (87) | VA (13) | TEA (25) | TBPPI (50) | 136 | 1900 | 19 |
| 2 | E (87) | VA (13) | TEA (25) | TBPPI (50) | 128 | 1900 | 17 |
| 3 | E (64) | VA (36) | TEA (25) | TBPPI (50) | 137 | 1900 | 17 |
| 4 | E (64) | VA (36) | TEA (25) | TBPPI (50) | 152 | 1900 | 29 |
| 5 | E (64) | VA (36) | TEA (50) | TBPPI (50) | 143 | 1900 | 25 |
| 6 | E (64) | VA (36) | TEA (50) | TBPPI (50) | 150 | 1900 | 33 |
| 7 | E (87) | VA (13) | TEA (25) | TBPEH (50) | 145 | 1900 | 23 |
| 8 | E (87) | VA (13) | TDDA (25) | TBPPI (50) | 135 | 1900 | 19 |
| 9 | E (90) | MA (10) | TEA (25) | TBPPI (50) | 140 | 1900 | 21 |
| 10 | E (87) | VA (13) | — | TBPPI (50) | 139 | 1900 | 14.5 |
| 11 | E (87) | VA (13) | TEA (50) | TBPPI (50) | 150 | 1000 | 9.4 |
| 12 | E (64) | VA (36) | TEA (10) | TBPPI (25) | 200 | 1900 | 3.5 |

It will be understood that the specification and examples are illustrative but not limitative of the present invention and that other embodiments within the spirit and scope of the inventions will suggest themselves to those skilled in the art.

We claim:

1. A process for the production of ethylene co-polymers comprising polymerizing ethylene with further polymerizable monomers at a pressure of >300 bar in the presence of a catalyst system, said catalyst system comprising at least one compound selected from the group of organo-aluminum compounds of the formula $AlR_3$ wherein R can be the same or different and is an alkyl, alkenyl, aryl, aralkyl or cycloalkyl radical and at least one organic peroxide, wherein said further polymerizable monomers comprise from 10 to 36 wt. % by weight of the monomers.

2. The process of claim 1, wherein the process is conducted at a temperature of at least 80° C.

* * * * *